United States Patent
Schrad et al.

(10) Patent No.: US 10,809,022 B2
(45) Date of Patent: Oct. 20, 2020

(54) PROCESSES AND SYSTEMS FOR CONTROLLING COOLING FLUID IN AN IONIC LIQUID REACTOR SYSTEM WITH A HEAT EXCHANGER

(71) Applicant: UOP LLC, Des Plaines, IL (US)

(72) Inventors: Gregory J. Schrad, Naperville, IL (US); James G. Hagen, Arlington Heights, IL (US); Sean G. Mueller, Des Plaines, IL (US); Trung Pham, Mount Prospect, IL (US); Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 149 days.

(21) Appl. No.: 15/843,379

(22) Filed: Dec. 15, 2017

(65) Prior Publication Data

US 2018/0128560 A1  May 10, 2018

Related U.S. Application Data

(63) Continuation of application No. PCT/US2016/036405, filed on Jun. 8, 2016.
(Continued)

(51) Int. Cl.
*F28F 27/02* (2006.01)
*F25D 17/02* (2006.01)
(Continued)

(52) U.S. Cl.
CPC .............. *F28F 27/02* (2013.01); *B01J 14/00* (2013.01); *B01J 19/00* (2013.01); *B01J 19/0013* (2013.01);
(Continued)

(58) Field of Classification Search
CPC ........ F28F 27/02; F28F 13/00; F28F 2250/06; F25D 17/00; F25D 17/02; B01J 19/00
See application file for complete search history.

(56) References Cited

U.S. PATENT DOCUMENTS 2,835,477 A   5/1958  Theodore et al.
4,008,049 A   2/1977  Clemmer et al.
(Continued)

FOREIGN PATENT DOCUMENTS

CN   101311194 A1   11/2008
EP     1113233 A2    7/2001
(Continued)

OTHER PUBLICATIONS

Search Report dated Sep. 22, 2016 for corresponding PCT Appl. No. PCT/US2016/036405.
(Continued)

*Primary Examiner* — Elizabeth J Martin

(57) ABSTRACT

Processes for controlling the rate and temperature of cooling fluid through a heat exchange zone in, for example, an alkylation reactor using an ionic liquid catalyst. A cooling fluid system may be used to provide the cooling fluid which includes a chiller and a reservoir. The cooling fluid may pass from the reservoir through the heat exchange zone. A bypass line may be used to pass a portion of the cooling fluid around the heat exchange zone. The amount of cooling fluid may be adjusted, with a valve, based upon the temperature of the cooled process fluid flowing out of the heat exchange zone. Some of the cooling fluid from the chiller may be circulated back to the chiller in a chiller loop.

15 Claims, 4 Drawing Sheets

Related U.S. Application Data

(60) Provisional application No. 62/181,531, filed on Jun. 18, 2015.

(51) Int. Cl.
  B01J 14/00 (2006.01)
  B01J 19/00 (2006.01)
  F28D 21/00 (2006.01)

(52) U.S. Cl.
  CPC ............ *F25D 17/02* (2013.01); *F28D 21/00* (2013.01); *B01J 2219/0011* (2013.01); *B01J 2219/00047* (2013.01); *B01J 2219/00063* (2013.01); *B01J 2219/00076* (2013.01); *B01J 2219/00081* (2013.01); *B01J 2219/00083* (2013.01); *B01J 2219/00085* (2013.01); *B01J 2219/00103* (2013.01); *B01J 2219/00202* (2013.01); *B01J 2219/00211* (2013.01); *B01J 2219/00238* (2013.01); *F28D 2021/0022* (2013.01); *F28F 2250/06* (2013.01)

(56) References Cited

U.S. PATENT DOCUMENTS

| | | |
|---|---|---|
| 4,637,454 A | 1/1987 | Lowes |
| 4,764,440 A | 8/1988 | Jones et al. |
| 4,798,242 A | 1/1989 | Kito et al. |
| 5,104,840 A | 4/1992 | Chauvin et al. |
| 5,131,232 A | 7/1992 | Uno et al. |
| 5,824,832 A | 10/1998 | Sherif et al. |
| 6,298,677 B1 * | 10/2001 | Bujak, Jr. ............... F24F 3/06 62/158 |
| 8,920,755 B2 | 12/2014 | Cleverdon et al. |
| 2009/0171133 A1 | 7/2009 | Luo et al. |
| 2011/0192188 A1 * | 8/2011 | Nickey ............... F28B 1/06 62/507 |
| 2013/0066130 A1 | 3/2013 | Luo et al. |
| 2014/0024874 A1 | 1/2014 | Ahmed et al. |

FOREIGN PATENT DOCUMENTS

| | | |
|---|---|---|
| WO | 2005063567 A1 | 7/2005 |
| WO | 2011097583 A2 | 8/2011 |

OTHER PUBLICATIONS

European Search Report and Written Opinion for corresponding European application No. EP 16 81 2162, dated Feb. 15, 2019.

Chinese patent office action for Chinese Patent Application No. 201680021040.1, dated Oct. 8, 2018.

* cited by examiner

PROCESSES AND SYSTEMS FOR CONTROLLING COOLING FLUID IN AN IONIC LIQUID REACTOR SYSTEM WITH A HEAT EXCHANGER

CROSS-REFERENCE TO RELATED APPLICATIONS

This application is a Continuation of International Application No. PCT/US2016/036405 filed Jun. 8, 2016 which application claims benefit of U.S. Provisional Application No. 62/181,531 filed Jun. 18, 2015, the contents of which cited applications are hereby incorporated by reference in their entirety.

FIELD OF THE INVENTION

This invention relates generally to an ionic liquid reactor and more particularly to an ionic liquid reactor with a heat exchange zone, and even more particularly to a process and system for providing the cooling fluid for the heat exchange zone.

BACKGROUND OF THE INVENTION

Ionic liquids are essentially salts in a liquid state, and are described in U.S. Pat. Nos. 4,764,440, 5,104,840, and 5,824,832. The properties vary extensively for different ionic liquids, and the use of ionic liquids depends on the properties of a given ionic liquid. Depending on the organic cation of the ionic liquid and the anion, the ionic liquid can have very different properties. The behavior of the ionic liquid varies considerably with temperatures, and it is preferred to find ionic liquids that do not require operation under more extreme conditions such as refrigeration.

Acidic ionic liquid may be used as a catalyst in various chemical reactions, such as for the alkylation of iso-paraffins with olefins. The alkylation reaction is highly exothermic. To control the temperature, it is common for part of the unreacted light hydrocarbons to be vaporized. However, controlling the temperature by vaporization is undesirable because it makes the reactor operation, the ionic liquid dispersion, and the acid concentration more difficult to control. Therefore, it is believed to be more desirable to control the temperature while the reactants and products are maintained in liquid form.

While it would be desirable to utilize heat exchange to control the temperature, any heat exchanger will need to be configured to minimize the impact of the ionic liquid phase on heat transfer due to its high viscosity and potential for fouling of the heat transfer surface.

Additionally, as will be appreciated, conjunct polymer is often a byproduct of the various ionic liquid catalyst reactions including but not limited to alkylation, oligomerization, isomerization, and disproportionation. Conjunct polymer is typically highly conjugated, olefinic, highly cyclic hydrocarbons. The conjunct polymer is often associated with ionic liquid and will also impact heat transfer in similar ways as ionic liquid.

It would be desirable to provide an efficient heat removal system and processes for removing heat from an ionic liquid alkylation process. It would also be desirable for such a system and processes to include one or more heat exchangers that can effectively control the heat produced by exothermic reactions without the need of vaporization. It would further be desirable to provide an efficient heat removal system that provides flexibility in operating an alkylation process with variable reaction temperatures and variable heat duties.

SUMMARY OF THE INVENTION

One or more heat removal systems and processes for removing heat from an ionic liquid alkylation process for controlling the heat of the ionic liquid alkylation have been invented.

In a first aspect of the present invention, the invention may be broadly characterized as providing a process for controlling a flow of a cooling fluid through a heat exchanger by: passing a cooling fluid from a chilling zone to a reservoir; passing a first portion of the cooling fluid from the reservoir through a heat exchange zone; passing a second portion of the cooling fluid from the reservoir through a bypass line around the heat exchange zone; passing a process fluid through the heat exchange zone; and, absorbing heat from the process fluid with the cooling fluid in the heat exchange zone to provide a cooled process fluid.

In one or more embodiments of the present invention, the process includes adjusting the second portion of the cooling fluid from the reservoir that flows through a bypass line based upon a temperature of the cooled process fluid.

In some embodiments of the present invention, the temperature of the first portion of the cooling fluid such as mixed glycol and water from the reservoir is between −6.7 to 26.7° C. (20 to 80° F.).

In at least one embodiment of the present invention, the temperature of the first portion of the cooling fluid from the reservoir is approximately 1.7 to 12.8° C. (35 to 55° F.).

In various embodiments of the present invention, the heat exchange zone comprises at least one heat exchanger. In one embodiment, the heat exchanger is disposed inside a reaction zone for removal of the heat from reaction. In another embodiment, the heat exchanger is placed outside a reaction zone. In yet another embodiment, a plurality of heat exchange zones and reaction zones are used.

In some embodiments of the present invention, only a first portion of the cooling fluid is passed from the chilling zone to the reservoir. The process may further include recirculating a second portion of the cooling fluid in a recirculation loop.

In a second aspect of the present invention, the invention may be broadly characterized as providing a fluid circulation system comprising: a chiller configured to provide cooling fluid; a reservoir configured to receive the cooling fluid and to provide at least one cooling stream, the reservoir in communication with a cooling fluid inlet of at least one heat exchanger in at least one heat exchange zone; and, a bypass line configured to pass cooling fluid around the at least one heat exchange zone and return the cooling fluid to the chiller without passing through the at least one heat exchanger in the at least one heat exchange zone. The at least one heat exchange zone is disposed inside or outside a reaction zone.

In one or more embodiments of the present invention, the cooling fluid circulation system further includes a chiller loop configured to circulate a portion of cooling fluid from the chiller past the reservoir and back to the chiller.

In various embodiments of the present invention, the cooling fluid circulation system further includes a second reservoir configured to receive cooling fluid from the at least one heat exchanger in the at least one heat exchange zone and further configured to provide cooling fluid to the chiller. It is contemplated that the second reservoir is also configured to receive cooling fluid from the bypass line.

In some embodiments of the present invention, the cooling fluid circulation system further includes at least one valve disposed in the bypass line configured to adjust an amount of cooling fluid passing therethrough. It is contemplated that the system also includes a probe configured to measure a temperature of a process fluid exiting the at least one heat exchanger in the at least one heat exchange zone disposed inside or outside a reaction zone. The probe is in communication with the at least one valve disposed in the bypass line. It is also contemplated that the system includes at least one valve disposed between the reservoir and the chiller and configured to adjust an amount of cooling fluid passed to the reservoir from the chiller. It is still further contemplated that the at least one valve disposed between the reservoir and the chiller is in communication with the probe.

In a third aspect of the present invention, the invention may be broadly characterized as a providing a process for controlling a flow of a cooling fluid through a heat exchanger by: cooling a fluid to a desired temperature in a chilling zone; passing the fluid from the chilling zone to a reservoir at a first flow rate; passing a fluid from the reservoir through a heat exchange zone at a second flow rate; removing heat from a process fluid with the fluid from the reservoir in the heat exchange zone to provide a heated fluid and a cooled process fluid; passing the heated fluid back to the chilling zone; and, adjusting at least one of the first flow rate and the second flow rate based upon a temperature of the cooled process fluid.

In one or more embodiments of the present invention, the process includes passing a fluid from the reservoir around the heat exchange zone via a bypass line at a third flow rate. It is contemplated that a sum of the third flow rate and the second flow rate is equal to the first flow rate. It is also contemplated that a sum of the third flow rate and the second flow rate is greater than the first flow rate.

Additional aspects, embodiments, and details of the invention, which may be combined in any manner, are set forth in the following detailed description of the invention.

DETAILED DESCRIPTION OF THE DRAWINGS

In the drawings of the present invention, one or more embodiments are shown in which like numerals denote like elements, and in which.

DETAILED DESCRIPTION OF THE INVENTION

As mentioned above, a cooling fluid circulation system and a process for circulating cooling fluid in an ionic liquid catalyst reactor system have been invented. Generally the system and processes provide an internal cooling system supplying a temperature range of −6.7 to 26.7° C. (20 to 80° F.) independently from the supply tower water temperature or wet bulb temperature. The cooling fluid source temperature for the reactors is preferably controlled in a range of 1.7 to 12.8° C. (35 to 55° F.) while the cooling water temperature for columns and other units is controlled at 18.3 to 23.9° C. (65 to 75° F.). The water cooling systems described here are designed based on a primary chiller system that will allow intermediate cooling to control the amount and water temperatures in a range of 1.7 to 23.9° C. (35 to 75° F.) necessary for all the heat exchangers in the process. Having this control is desirable as the ambient or tower water from the refinery could have wide fluctuations that could affect heat exchanger performance and consequently alkylate product quality.

The heat exchangers for the reactor section should be designed with the minimum fouling probability and ease of service. Various types of exchangers can be designed or selected depending on plant scale, i.e., modular add-on reactors, or large commercial size. Different types of heat exchanger designs were considered and evaluated for heat removal for an ionic liquid alkylation process. These include but are not limited to hairpin, shell-and-tube, and spiral plate exchangers. Certain special designs further allow separation of ionic liquids and hydrocarbon phase reducing the contact time of the two fluids and potential fouling of ionic liquid on heat transfer surfaces.

The ability to control temperature is beneficial for product quality such as selectivity of desired components and alkylate octane value. At the same time, cooling water from refinery tower can be efficiently managed with a tempered water system coupled with a refrigeration system capable of cooling a mixture of glycol and water down to 1.7° C. (35° F.). While the water bulk temperature might fluctuate from 23.9 to 35° C. (75 to 95° F.) depending on refinery sites, the tempered water system is designed to provide cooling water with a temperature between 1.7 to 23.9° C. (35 to 75° F.) to supply to exchangers for the whole alkylation process.

With these general principles of the present invention in mind, one or more exemplary embodiments of the present invention will now be described with the understanding that the following is exemplary in nature and is not intended to be limiting.

Figure 1:
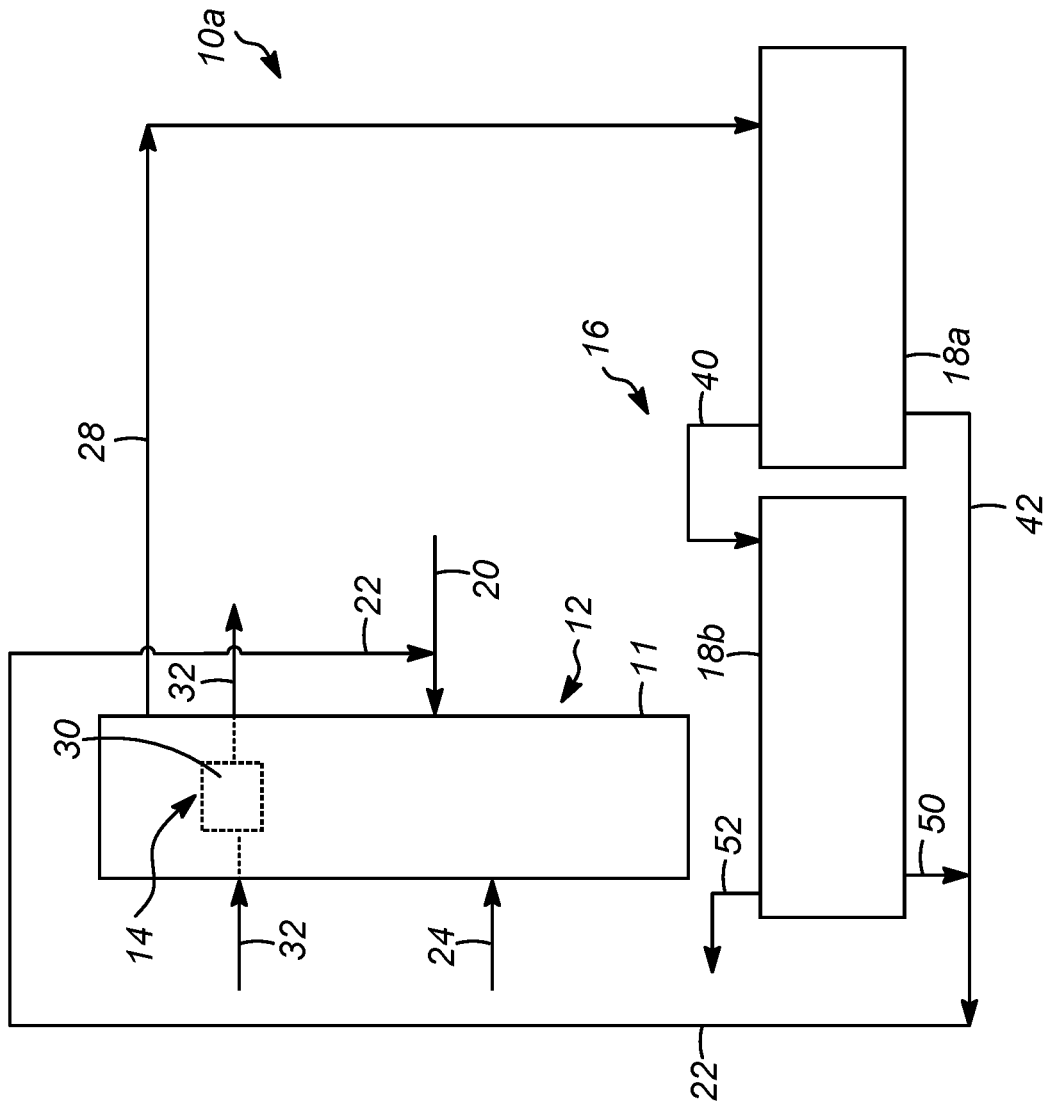
FIG. 1 shows an ionic liquid catalyst reactor system that may be used in accordance with one or more embodiments of the present invention.

As shown in FIG. 1, an ionic liquid catalyst reactor system 10a that may be used in accordance with the various embodiments of the present invention includes a vessel 11 that comprises a reaction zone 12 and a heat exchange zone 14 inside of the vessel 11 and the reaction zone 12. In a preferred embodiment, the ionic liquid catalyst reactor system 10a is utilized for an alkylation reaction, and therefore the present invention will be described in relation to an alkylation reaction, with the understanding that the present invention is not necessarily limited to same and can be practiced in association with different exothermic reactions.

The reaction zone 12 preferably receives an iC4 hydrocarbon stream 20. As will be appreciated, other iso-paraffins may be utilized in accordance with the present invention. Additionally, an ionic liquid catalyst stream 22 is also passed into the reaction zone 12. Preferably, as shown, the ionic liquid catalyst stream 22 is combined with the iC4 hydrocarbon stream 20. However, this is merely preferred. Finally, the reaction zone 12 also receives an olefin hydrocarbon stream 24 comprising C4 olefinic hydrocarbons. The olefinic hydrocarbon stream 24 can include iC4 hydrocarbons as well to dilute the olefinic hydrocarbons before entering the reaction zone 12. The overall concentration of iC4 hydrocarbons in the reaction zone 12 is preferably well above the stoichiometric requirement of the alkylation reaction to minimize the side reactions of olefins with non-iC4 hydrocarbons.

In the reaction zone 12, which is operated under proper conditions, such as at a temperature of between 20 to 30° C. (68 to 86° F.) under a pressure that keeps all reactants and catalysts in liquid phase, the olefinic hydrocarbons will react with the iC4 hydrocarbons to form alkylated hydrocarbons, primarily iso-octane and other trimethylpentanes. The liquids within the vessel 11 of the reaction zone 12 will flow through the heat exchange zone 14 of the reaction zone 12.

In the heat exchange zone 14, a heat exchanger 30 will allow for the transfer of heat from the liquids in the vessel 11 (or in the reaction zone 12) to a cooling fluid 32. The supply and removal of the cooling fluid 32 is discussed in more detail below. An effluent stream 28 from the reaction zone 12 will be passed to a separation zone 16 having one or more separation vessels 18a, 18b. In the first separation vessel 18a of the separation zone 16, the effluent stream 28 will be separated into a lighter hydrocarbon phase and a heavier, ionic liquid catalyst phase. An ionic liquid catalyst stream 42 may be withdrawn and recycled in the processes, as is shown. Part of the ionic liquid catalyst may be regenerated and then recycled. Additionally, a hydrocarbon phase 40 may be withdrawn from the first separation vessel 18a and passed to a second separation vessel 18b.

In the second separation vessel 18b, the hydrocarbon phase will be further separated and provide a second ionic liquid catalyst stream 50. A hydrocarbon product stream 52, in this case comprising an alkylate product, can be passed from the separation zone 16 to a fractionation column (not shown) or other separation unit to separate the various hydrocarbons in the product stream 52. In various embodiments, the amount of ionic liquid in the hydrocarbon product stream 52 is preferably less than 100 ppm, and more preferably less than 20 ppm. The alkylate product can be used as a fuel or fuel blending component. Although not depicted as such, entrained droplets of ionic liquid catalyst within the hydrocarbon phases in either separation vessel 18a, 18b may be further separated with, for example, a coalescing material, such as glass beads, fibers or electrostatic separation devices.

Figure 2:
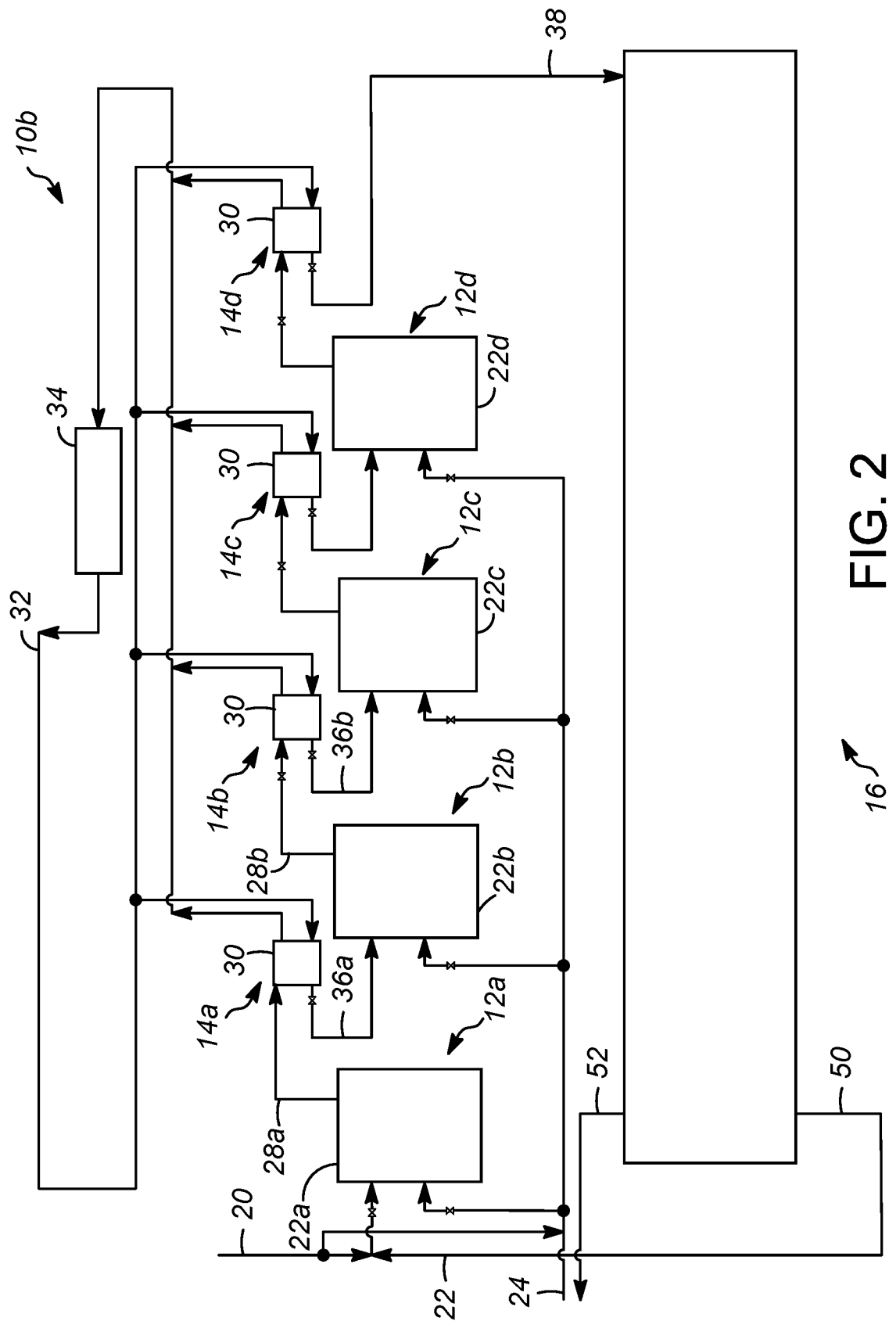
FIG. 2 shows another ionic liquid catalyst reactor system that may be used in accordance with one or more embodiments of the present invention.

Turning to FIG. 2, in another embodiment, an ionic liquid catalyst reactor system 10b includes a plurality of reaction zones 12a, 12b, 12c, 12d each including a reactor 22a, 22b, 22c, 22d. Preferably, the reaction zones 12a, 12b, 12c, 12d are arranged in a series. It should be appreciated that although not depicted as such, a single reactor vessel could be used with multiple separate reaction zones contained within the single vessel.

As shown in FIG. 2, a heat exchange zone 14a is disposed outside of the reaction zones, for example, between the first reaction zone 12a and the second reaction zone 12b. A second heat exchange zone 14b may also be disposed outside of a reaction zone, for example, between the second reaction zone 12b and the third reaction zone 12c. This alternating pattern of reaction zones 12a, 12b . . . and heat exchange zones 14a, 14b . . . may be repeated such that a heat exchange zone is disposed between successive reaction zones and provide an ionic liquid catalyst reactor system with a heat exchange zone being disposed outside of a reaction zone. A final heat exchange zone 14d may be disposed between the last reaction zone 12d and the separation zone 16 or may be omitted. Additional heat exchangers (not shown) may be placed before the first reaction zone 12a to cool the inlet streams 20, 24 for maintaining the temperatures of the inlet streams and the fluid in the first reaction zone in desired levels.

In an exemplary embodiment, the iC4 hydrocarbon stream 20 and the ionic liquid catalyst stream 22 are passed to the first reaction zone 12a. As shown, the ionic liquid catalyst stream 22 is mixed with the iC4 hydrocarbon stream 20 prior to being passed to the first reactor vessel 22a. Once again, this is merely preferred. The olefin hydrocarbon stream 24 comprising C4 olefinic hydrocarbons is also passed into the first reaction zone 12a. As with the previous embodiment, the olefinic hydrocarbon stream 24 can include iC4 hydrocarbons as well to dilute the olefinic hydrocarbons before entering the reactor vessel 22a. The overall concentration of iC4 hydrocarbons in the reactor vessel 22a is preferably well above the stoichiometric requirement of the alkylation reaction to minimize the side reactions of olefins with non-iC4 hydrocarbons.

In the first reactor vessel 22a, which is operated under proper conditions, such as at a temperature of between 4.4° to 37.8° C. (40° to 100° F.) under a pressure that keeps all reactants and catalysts in liquid phase, the olefinic hydrocarbons will react with the iC4 hydrocarbons to form alkylated hydrocarbons, primarily iso-octane and other trimethylpentanes. In order to mix the ionic liquid catalyst and the hydrocarbons, the first reaction zone 12a includes one or more impellers (not shown). The impeller(s) may also disperse the ionic liquid catalyst. The products of the reaction, excess reactants (mainly iC4 hydrocarbons), and the ionic liquid catalyst are passed out of the first reactor vessel 22a in an effluent stream 28a.

The effluent stream 28a from the first reaction zone 12a is passed to the first heat exchange zone 14a. Each heat exchange zone 14a, 14b . . . can include one or more heat exchangers 30. The heat exchangers 30 may comprise any style and form and may have a vertical, a horizontal or a tilted orientation. Within the first heat exchange zone 14a, the effluent 28a will be cooled via a cooling fluid 32 provided by a cooling fluid circulation system 34 (discussed in more detail below). As will be appreciated, the cooling fluid 32 will absorb heat from the effluent in the heat exchanger 30.

At least a portion cooled effluent stream 36a may be passed from the first heat exchange zone 14a to the second reaction zone 12b. The second reaction zone 12b will receive iC4 hydrocarbons (and other hydrocarbons) from the cooled effluent stream 36a, as well as fresh hydrocarbons, for example from the olefin stream 24. Again, as shown part of the iC4 hydrocarbon stream 20 may be combined with the olefin stream 24 to dilute the concentration of olefins in stream 24 before it enters into the second reaction zone 12b. The second reaction zone 12b preferably operates in the same manner and under similar temperatures as the first reaction zone 12a and, thus will likewise produce an effluent stream 28b containing more alkylate components than effluent stream 28a.

The effluent stream 28b from the second reaction zone 12b will be passed to the second heat exchange zone 14b, comprises one or more heat exchanges 30 which also receive the cooling fluid 32. A cooled effluent stream 36b from the second heat exchange zone 14b may be passed to a third reaction zone 12c, and so on and so forth.

A net effluent stream 38, comprising hydrocarbons and ionic liquid catalyst, may be passed to the separation zone 16 to be separated into a lighter hydrocarbon phase 52 and a heavier, ionic liquid catalyst phase 50. In the separation zone 16, entrained droplets of ionic liquid catalyst within the hydrocarbon phase may be further separated, for example with a coalescing material, such as glass beads, fibers or electrostatic separation devices. The ionic liquid catalyst stream 50 comprising ionic liquid catalyst separated in the separation zone 16 can be returned to the reaction zones 12a, 12b . . . A hydrocarbon product stream 52, in this case comprising an alkylate product, can be passed from the separation zone 16 to a fractionation column (not shown) or other separation unit to separate the various hydrocarbons in the product stream 52.

As mentioned above, maintaining a proper temperature of the cooling fluid 32 passed to the heat exchanges zones 14a, 14b . . . is important for a variety of reasons, including, controlling the temperature within the reaction zones 12a, 12b . . . , increasing the product yield, and maintaining product quality. Additionally, it is desirable to maintain a certain velocity or rate of cooling fluid though the heat exchangers 30 in the heat exchanges zones 14a, 14b . . . In a preferred embodiment, the temperature of the cooling fluid is between −6.7 to 26.7° C. (20 to 80° F.), or between 1.7 to 12.8° C. (35 to 55° F.). Accordingly, as shown in FIGS. 3 and 4, preferred cooling fluid circulation systems 34 are shown.

Figure 3:
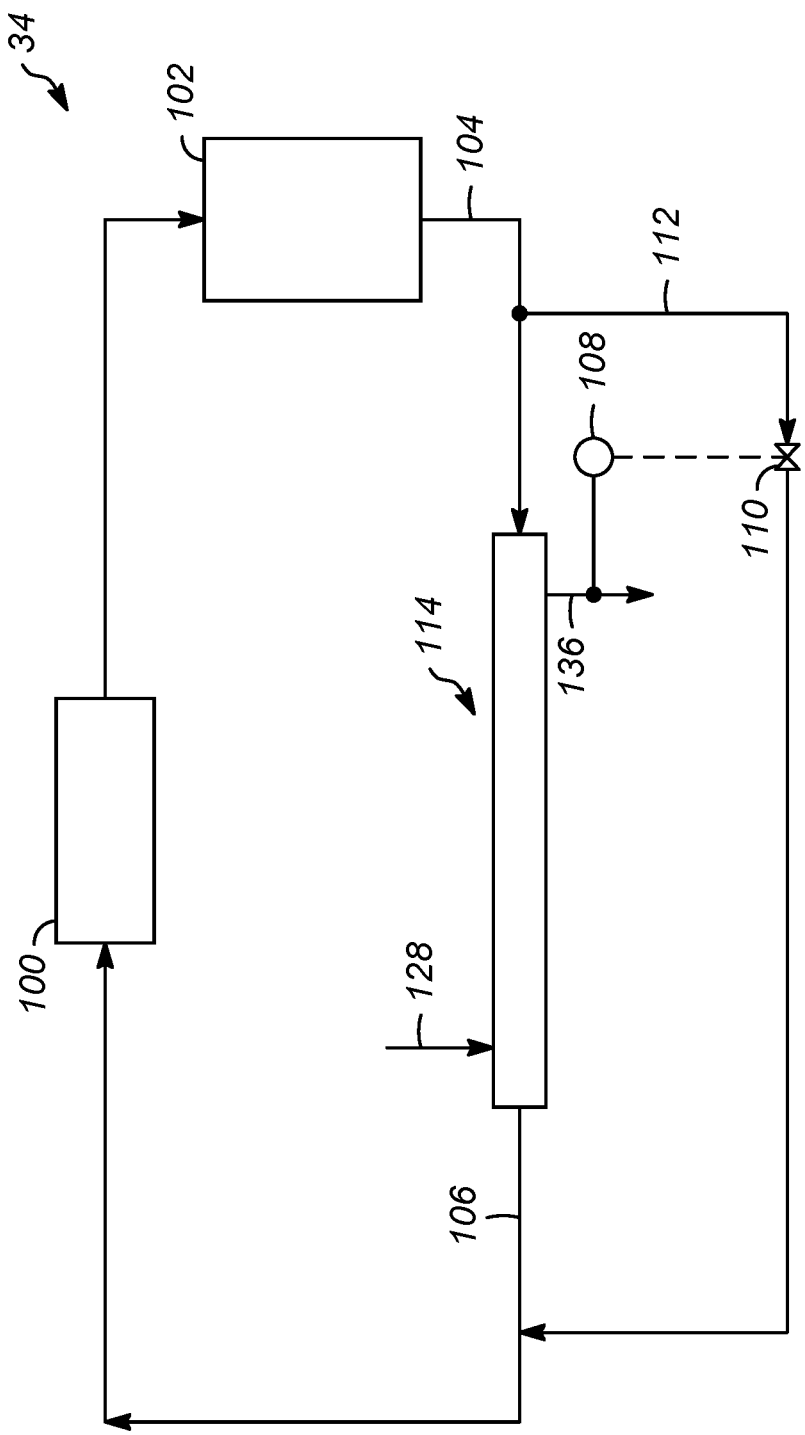
FIG. 3 shows a cooling fluid circulation system according to one or more embodiments of the present invention; and, FIG. 4 shows another cooling fluid circulation system according to one or more embodiments of the present invention.

In FIG. 3, the cooling fluid circulation system 34 includes a chiller 100 and a reservoir 102. The chiller 100 will cool the cooling fluid, such as water or a mixture of glycol and water, to a desired temperature and at a desired rate. The cooling fluid is passed from the chiller 100 to the reservoir 102 at first flow rate. A stream 104 of cooling fluid may be withdrawn from the reservoir 102. The stream 104 of cooling fluid withdrawn from the reservoir 102 is passed to a heat exchange zone 114, such as the heat exchange zones 14, 14a, 14b . . . shown in FIGS. 1 and 2. In the heat exchange zone 114, the cooling fluid will absorb heat from a process fluid 128, such as the effluent streams 28a, 28b . . . shown in FIG. 2 or the liquid within the vessel 11 of FIG. 1. A heated cooling fluid 106 may be passed back to the chiller 100 and a cooled process fluid 136 may comprise the cooled effluent streams 36a, 36b . . . described above with reference to FIG. 2 or the effluent stream 28 shown in FIG. 1.

It is preferable to adjust the flow rate of the stream 104 of cooling fluid through the heat exchange zone 114, accordingly a probe 108, such as a temperature sensor, thermocouple or the like, is configured to measure (or determine) the temperature of the cooled process fluid 136. The probe 108 may be in communication with a valve 110 configured to adjust the flow through a line based upon the measured temperature. However, since maintaining a minimum flow rate through the heat exchange zone 114 is desirable, the valve 110 is disposed in a bypass line 112 which does not pass through the heat exchange zone 114 (or any of the heat exchange zones 14, 14a, 14b . . . ). It is understood, that the bypass line 112 could be used to cool some other process stream, but not the heat exchange zones 14a, 14b . . . in the ionic liquid catalyst reactor system 10. The rate of flow through the bypass line 112 will adjust based upon the temperature of the cooled process fluid 136. This, in turn, will ensure that the flow through the heat exchange zone 114 is at a desired level to obtain the desired cooling.

Figure 4:
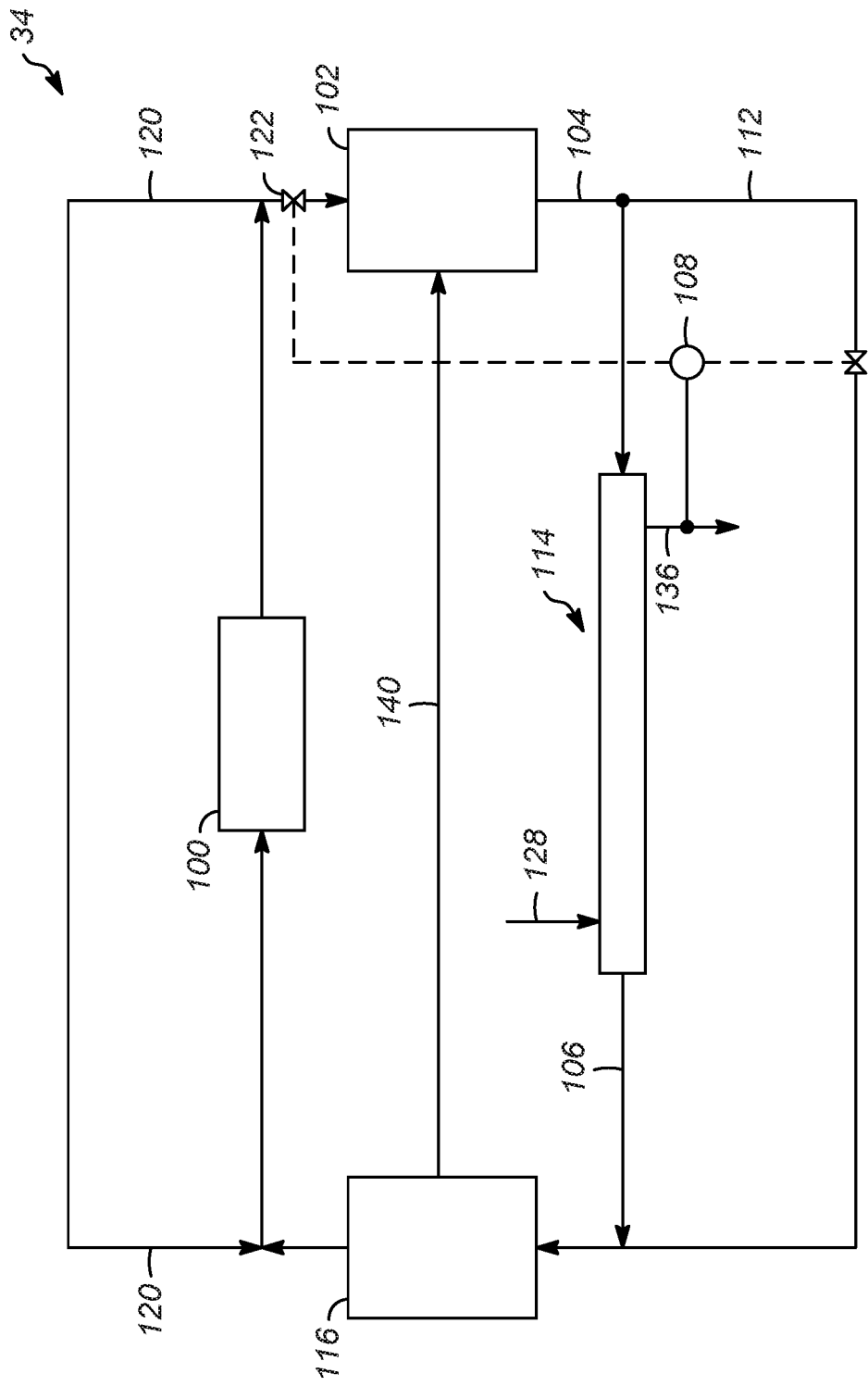

Turning to FIG. 4, in another cooling fluid circulation system 34, a second reservoir 116 is provided, in addition to the chiller 100 and first reservoir 102. The second reservoir 116 is configured to receive heated cooling fluid 106 from the heat exchange zone 114 and is further configured to recycle part of cooling fluid 140 in the second reservoir 116 back to the first reservoir 102 so that the stream 104 may be withdrawn at a second flow rate to the heat exchange zone 114 that may be greater than the first flow rate to keep certain cooling fluid velocity through the heat exchange zone 114. The second reservoir 116 may also be also configured to receive cooling fluid from the bypass line 112.

Additionally, in comparison to the embodiment shown in FIG. 3, in FIG. 4, the cooling fluid circulation system 34 also includes a chiller loop 120 configure to circulate cooling fluid back to the chiller 100 without passing to the reservoir 102 or the heat exchange zone 114. A second valve 122 may be disposed between the chiller loop 120 and the reservoir 102, and is preferably in communication with the sensor or probe 108 so that the valve 122 will adjust the flow of cooling fluid passed to the reservoir 102 if the temperature of the cooled process fluid 136 cannot be controlled by the valve on bypass line 112 only. This will ensure that the flow through the heat exchange zone 114 is sufficient to maintain the cooled process fluid 136 near the desired temperature.

The cooling fluid circulation systems 34 depicted in FIGS. 3 and 4 are merely preferred.

By providing a cooling fluid system that operates independently of the temperature of the cooling fluid from a cooling tower, a proper flow rate and temperature may be maintained within the heat exchange zones to ensure that the process fluid is cooled to the desired level even when the reaction process fluid temperature or flow rates are changed. Maintaining control of the temperature in the process fluid will reduce the impact of the heat exchange zone on the alkylate product.

It should be appreciated and understood by those of ordinary skill in the art that various other components such as valves, pumps, filters, coolers, mixing and coalescing devices, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for controlling a flow of a cooling fluid through a heat exchanger, the process comprising:
   passing a cooling fluid from a chiller to a first reservoir;
   passing a first portion of the cooling fluid from the first reservoir through a heat exchange zone;
   passing a second portion of the cooling fluid from the first reservoir through a bypass line around the heat exchange zone;
   passing a process fluid through the heat exchange zone;
   absorbing heat from the process fluid with the cooling fluid in the heat exchange zone to provide a cooled process fluid and a heated cooling fluid; and,
   recirculating a third portion of the cooling fluid from the chiller in a chiller loop without the third portion of the cooling fluid from the chiller passing to the first reservoir or the heat exchange zone.

2. The process of claim 1, further comprising:
   adjusting the second portion of the cooling fluid from the first reservoir that flows through the bypass line based upon a temperature of the cooled process fluid.

3. The process of claim 1, wherein a temperature of the first portion of the cooling fluid from the first reservoir is between approximately −6.7 to 26.7° C. (20 to 80° F.).

4. The process of claim 1, wherein a temperature of the first portion of the cooling fluid from the first reservoir is between approximately 1.7 to 12.8° C. (35 to 55° F.).

5. The process of claim 1, wherein the heat exchange zone comprises a plurality of heat exchangers.

6. The process of claim 5, wherein a first heat exchanger from the plurality of heat exchangers receives a process fluid from a first reaction zone, and wherein a second heat exchanger from the plurality of heat exchangers receives a process fluid from a second reaction zone different than the first reaction zone.

7. The process of claim 1, wherein the heat exchange zone is disposed within a reaction zone.

8. A process for controlling a flow of a cooling fluid through a heat exchanger, the process comprising:
    passing a cooling fluid from a chiller to a first reservoir;
    passing a first portion of the cooling fluid from the first reservoir through a heat exchange zone;
    passing a second portion of the cooling fluid from the first reservoir through a bypass line around the heat exchange zone;
    passing a process fluid through the heat exchange zone;
    absorbing heat from the process fluid with the cooling fluid in the heat exchange zone to provide a cooled process fluid and a heated cooling fluid;
    passing a first portion of the heated cooling fluid to the first reservoir; and,
    passing a second portion of the heated cooling fluid to the chiller.

9. The process of claim 8, further comprising:
    adjusting the second portion of the cooling fluid from the first reservoir that flows through the bypass line based upon a temperature of the cooled process fluid.

10. The process of claim 8, wherein a temperature of the first portion of the cooling fluid from the first reservoir is between approximately −6.7 to 26.7° C. (20 to 80° F.).

11. The process of claim 8, wherein a temperature of the first portion of the cooling fluid from the first reservoir is between approximately 1.7 to 12.8° C. (35 to 55° F.).

12. The process of claim 8, wherein the heat exchange zone comprises a plurality of heat exchangers.

13. The process of claim 8, further comprising:
    recirculating a third portion of the cooling fluid from the chiller in a chiller loop without the third portion of the cooling fluid from the chiller passing to the first reservoir or the heat exchange zone.

14. The process of claim 8, further comprising:
    passing the heated cooling fluid to a second reservoir, and wherein the second reservoir provides the first portion of the heated cooling fluid and the second portion of the heated cooling fluid.

15. The process of claim 14, wherein the second reservoir receives the second portion of the cooling fluid from the bypass line.

* * * * *